UNITED STATES PATENT OFFICE.

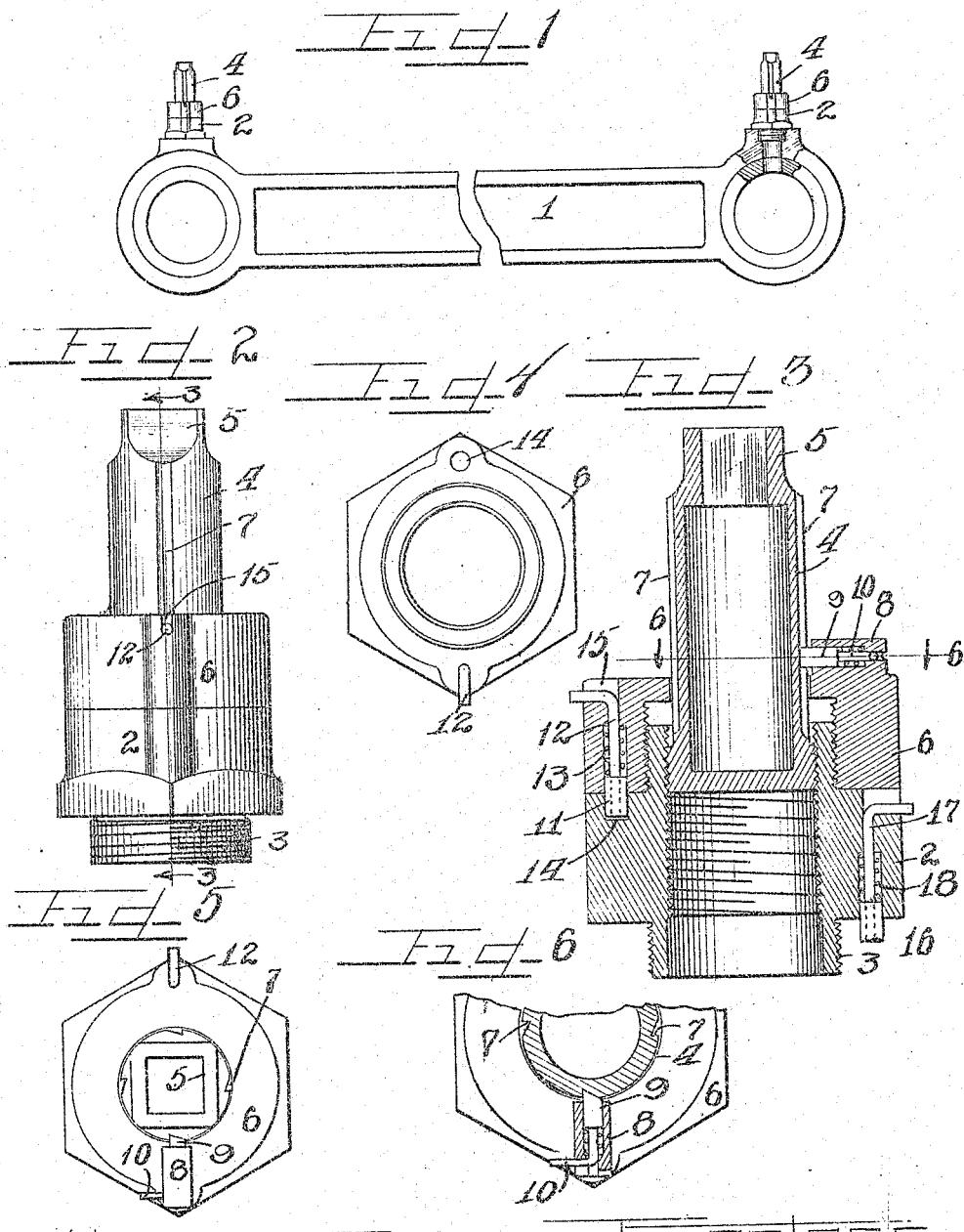

PHILIP G. MARGETTS AND CHARLES M. HUMMELL, OF CHICAGO, ILLINOIS.

LUBRICATING-CUP.

1,191,208. Specification of Letters Patent. Patented July 18, 1916.

Application filed December 3, 1915. Serial No. 64,820.

*To all whom it may concern:*

Be it known that we, PHILIP G. MARGETTS and CHARLES M. HUMMELL, citizens of the United States, and residents of the city of Chicago, in the county of Cook and State of Illinois, have invented certain new and useful Improvements in Lubricating-Cups; and we do hereby declare that the following is a full, clear, and exact description of the same, reference being had to the accompanying drawings, and to the numerals of reference marked thereon, which form a part of this specification.

Great difficulty, annoyance and inconvenience, and at times serious damage, has occurred due to the loss of all or part of lubricating or grease cups on one of the moving members of a machine. This is particularly true in the case of high speed mechanisms, and where the ordinary grease cup is used in the event that the same becomes loosened and is thrown off, a person struck thereby may be seriously injured or perhaps killed. This is largely due to the fact that the ordinary type of grease cup is threaded into the mechanism which it is desired to lubricate, and, if such mechanism is a moving element, in time the grease cup or a part thereof will become loosened and thrown off.

This invention relates to a means for positively locking the base of a lubricating cup in place on a mechanism, said base provided with a locking or retaining means for the adjustable parts of the cup by which the grease is forced into the mechanism, preventing loss or accidental loosening movement thereof.

It is an object therefore of this invention to construct a lubricating cup provided with a base adapted to be secured to a part to be lubricated, the base having means associated therewith for positively locking the same on said means, and with a retaining cap for a movable plunger threaded on said base and releasably locked thereon and carrying a ratchet acting mechanism to prevent retractive movement of the plunger from the base.

It is also an object of this invention to construct a grease cup comprising a base adapted for connection to a part to be lubricated having a spring impelled locking means to prevent accidental detachment of said base and with a threaded plunger mounted in said base extending through a retaining collar or cap threaded on said base, said retaining collar releasably locked to said base and provided with ratchet means to prevent retractive movement of the plunger except when said means is retracted.

It is furthermore an important object of this invention to construct a grease cup wherein the movable elements thereof are interlocked to prevent accidental loss, and with a locking means for positively locking the grease cup attached on the member which it is desired to lubricate.

It is finally an object of this invention to construct an improved type of lubricating cup with the parts interlocked to prevent loss thereof and provided with locking means for locking the cup positively to a mechanism to be lubricated.

The invention (in a preferred form) is illustrated in the drawings and hereinafter more fully described.

In the drawings: Figure 1 is a fragmentary elevation of a connecting rod equipped with lubricating cups embodying the principles of our invention. Fig. 2 is an enlarged side elevation of one of the lubricating cups. Fig. 3 is a central vertical section taken through the cup on line 3—3 of Fig. 2, with parts shown in elevation. Fig. 4 is a top plan view of the base member of the cup. Fig. 5 is a top plan view of the cup as shown in Fig. 2. Fig. 6 is a fragmentary detail section taken on line 6—6 of Fig. 3.

As shown in the drawings: The reference numeral 1, indicates as a whole a connecting rod, having mounted in the ends thereof grease cups embodying the principles of our invention. For this purpose a cylindrical container or base member 2, having a lower threaded extension 3, is threaded into the aperture provided for the purpose in the connecting rod, and is internally threaded to receive therein a plunger 4, for forcing the lubricant therethrough, the outer end of which is squared as indicated by the reference numeral 5, to permit easy actuation by the fingers or application of a tool thereto, if necessary, to rotate the same and thereby impart movement thereto inwardly or outwardly in the container. Threaded on the upper end of the base member 2, is an apertured retaining collar or cap 6, the aperture therein, however, being of less diameter than the lower threaded portion of said plunger 4, so that said plunger may not be entirely unthreaded from the base except by removal of said collar 6.

Said plunger 4, is made hollow merely for lightness, through not necessarily so, and four longitudinally disposed long ratchet teeth or ribs 7, are cut on the exterior thereof. Slidably mounted in a horizontal recess in a boss 8, formed on said retaining collar 6, is a spring impelled ratchet tooth 9, provided on its rear end with a right angled actuating finger piece 10, threaded thereinto, which, when thrown to the left, as shown in Fig. 6, permits projection of said tooth 9, into engagement with the teeth 7, on said plunger, and when thrown to the right with reference to Fig. 6, holds said tooth 9, retracted, said finger piece 10, resting in a small recess at the end of the boss 8. Mounted in a vertical aperture or recess within a boss formed on said cap 6, is a small plunger 11, provided with a stem 12, threaded thereinto and extending upwardly therefrom and bent outwardly at a right angle for convenient actuation of said plunger in retracting the same. Coiled about said stem is a compression spring 13, which acts normally to impel said plunger downwardly and into engagement with a recess 14, provided in the base member 2, whereby said collar 6, is locked from movement on said base member. Said plunger 11, may be retracted by the stem handle 12, and maintained retracted by throwing said stem handle to one side or the other of the recess 15, in which the stem normally seats when said plunger 11, is in locking or projected position, such as shown in Fig. 3.

Similar locking means to that already described is provided for the base member 2, in the connecting rod 1, and consists of a plunger 16, provided with an actuating stem 17, threaded thereinto and slidably mounted in a vertical recess formed in said base member 2. Coiled about the stem 17, within the recess for said plunger is a compression spring 18, normally acting to impel said plunger downwardly and into engagement with a recess provided therefor in the connecting rod 1, so as to lock said base member 2, thereon, and prevent rotational or unthreading movement thereof from the connecting rod.

The operation is as follows: In mounting the grease cup on a mechanism to be lubricated, the base member 2, is first threaded tightly into the aperture provided for the purpose, and the location of the plunger 16, with respect to the member marked by any suitable means for the purpose. The base 2, is then detached from the member to be lubricated, and a small hole drilled into the member to receive said plunger 16, when the base 2, is again attached thereto, so as to lock said base from rotation and consequent detachment. Said base member or container 2, is then filled with grease or other lubricant desired for the purpose, and the plunger 4, threaded into the upper end thereof, after which the collar 6, is inserted over the upper end of said plunger and threaded tightly on the upper threaded end of said base 2, with the plunger 11, mounted in said cap, latching in the recess 14, provided therefor in the upper surface of the base. Due to the fact that the lower threaded end of the plunger 4, is of greater diameter than the central aperture through the retaining collar 6, it is impossible to detach the plunger 4, without first detaching the cap 6, from the base 2. As a further precaution against accidental retractive movement of the plunger 4, by an unthreading or rotational movement thereof, the spring impelled ratchet tooth 9, is provided, mounted horizontally in the boss 8, on said collar 6, and engaging the longitudinal teeth 7, provided on said plunger 4. All of said respective locking members are similar in design and each may be retracted by the handle or stem provided for the purpose which, when retracted and rotated a slight amount, serves to retain the respective locking plunger or tooth, as the case may be, in retracted or unlocked position.

We are aware that various details of construction may be varied through a wide range without departing from the principles of this invention, and we therefore do not purpose limiting the patent granted otherwise than necessitated by the prior art.

We claim as our invention:

1. In a lubricating cup of the class described the combination with a base and plunger threaded therein, of a retaining collar threaded on said base to prevent detachment of the plunger therefrom, and locking mechanisms associated with said base and collar to lock said base to a member to which the same is attached and to lock the collar to said base to prevent retractive rotation of said plunger in said base.

2. In a lubricating cup of the class described a base for attachment to a member to be lubricated, a plunger mounted therein to force lubricant therefrom into said member, means retaining said plunger attached to said base, and locking mechanism for positively locking said base to said member to prevent accidental detachment of the lubricating cup therefrom.

3. In a lubricating cup of the class described a base, a plunger threaded therein, a collar threaded on said base, locking means to interlock said collar with said base to prevent retractive rotational movement of said collar from said base, and ratchet means associated with said collar adapted to prevent retractive rotation of said plunger in said base.

4. A lubricating cup of the class described comprising a base, means forcing lubricant therefrom, a locking device to prevent accidental detachment of said means therefrom, and mechanism operating to lock said base from accidental detachment from a member to be lubricated.

In testimony whereof we have hereunto subscribed our names in the presence of two subscribing witnesses.

PHILIP G. MARGETTS.
CHARLES M. HUMMELL.

Witnesses:
CHARLES W. HILLS, Jr.,
EARL M. HARDINE.